(12) United States Patent
Behrends et al.

(10) Patent No.: US 7,971,164 B2
(45) Date of Patent: Jun. 28, 2011

(54) ASSESSING RESOURCES REQUIRED TO COMPLETE A VLSI DESIGN

(75) Inventors: Derick G. Behrends, Rochester, MN (US); Travis R. Hebig, Rochester, MN (US); Daniel M. Nelson, Rochester, MN (US); Jesse D. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 12/100,481

(22) Filed: Apr. 10, 2008

(65) Prior Publication Data

US 2009/0259977 A1    Oct. 15, 2009

(51) Int. Cl.
*G06F 17/50*    (2006.01)

(52) U.S. Cl. .......... 716/104; 716/113; 716/132
(58) Field of Classification Search ......... 716/104, 716/113, 132
See application file for complete search history.

(56) References Cited

U.S. PATENT DOCUMENTS 7,424,690 B2 *    9/2008    Schultz et al. ............. 716/5

\* cited by examiner

*Primary Examiner* — Thuan Do
(74) *Attorney, Agent, or Firm* — Toler Law Group

(57) ABSTRACT

A system, method and program product are described in which schematics in a library that a user has tagged are read as ready for layout. The difficulty of each layout is assessed based on statistics indicative of the complexity of the schematic. The statistics may regard the number of connections, pins, devices, and other schematic information. The information is used to calculate the total amount of effort required to complete the design and generate a report.

20 Claims, 2 Drawing Sheets

| | status | difficulty | devices | pins | instances | network |
|---|---|---|---|---|---|---|
| a7x_bdec16_iodriver | x | 2.80 | 12 | 8 | 0 | 12 |
| a7x_bdec16_iodrv0 | | 1.30 | 0 | 16 | 4 | 6 |
| a7x_bdec16_iodrv1 | | 1.30 | 0 | 16 | 4 | 6 |
| a7x_bdec16_iodrv2 | x | 1.30 | 0 | 16 | 4 | 6 |
| a7x_bdec16_iodrv3 | x | 1.30 | 0 | 16 | 4 | 6 |
| a7x_bdec4_nand | | 1.00 | 4 | 3 | 0 | 5 |
| a7x_bdec4_nand0 | | 0.40 | 0 | 5 | 2 | 1 |
| a7x_bdec4_nand1 | | 0.40 | 0 | 5 | 2 | 1 |

| | |
|---|---|
| total books | 8 |
| total layout effort | 9.80 |
| books remain | 5 |
| layout effort remain | 4.40 |
| % complete | 44.9% |

— # ASSESSING RESOURCES REQUIRED TO COMPLETE A VLSI DESIGN

FIELD OF THE INVENTION

The present invention relates generally to a method and system for assessing the amount of resources required to complete a Very-Large-Scale Integration design. In addition, the invention relates to a program product used in the method and system.

BACKGROUND OF THE INVENTION

Very-Large-Scale Integration (VLSI) is the process of creating integrated circuits by combining thousands of transistor-based circuits into a single chip. VLSI began in the 1970s when complex semiconductor and communication technologies were being developed. Currently, as a result of VLSI design techniques, billion-transistor processors are commercially available, an example of which is Intel's Montecito Itanium Chip. Such large systems are expected to become more common as semiconductor fabrication moves from the current generation of 65 nm processors to the next 45 nm generation.

Due to the high complexity and size of current VLSI circuits and chips, present approaches employ a number of different computer tools throughout the VLSI design process. Such tools typically range from silicon layout editors, schematic capture tools and logical generators to logical optimizers and digital simulators. While not every tool may be used in the creation of every design, it is likely that a large subset will, and it is the combination of such tools that causes a large number of problems.

More particularly, while a given tool may be adapted to running on one machine architecture, another tool might only run on a different machine. This means that a designer must log in to the correct machine at each stage before running the associated tool. Moreover, as a design is processed, it must be passed from tool to tool. The designer may use a schematic capture tool for initial input, then desire that the design be minimized and finally simulated. However, nearly every tool inspects its input and produces its output in a unique format. All of this requires a large amount of time and effort in the design of a circuit.

As a result of today's extremely large VLSI designs and complexity of tools used, there is a growing need to accurately assess the amount of layout resource required to complete a given project on a given schedule, and to track the progress. Failure to do so often results in wasted resources, missed commitments and/or excessive burdens on the design teams.

Current methods of assessing layout resource requirements involve the counting of books required to complete the design. This is a time consuming, inaccurate and inflexible process. Further, the process does not take into account the variation in difficulty of each book. It should be noted that by the term "book" it is meant the file that contains a specific schematic diagram for which a layout is to be generated. By the term "schematic" it is meant a drawing or plan that uses symbols to represent circuit patterns, including electrical connections, parts and functions. A schematic is a diagram that represents the elements of a system using abstract, graphic symbols rather than realistic pictures.

In the field of VLSI design, a schematic is used to generate a circuit layout as part of the design process. A layout is the representation of a circuit in terms of planar geometric shapes that correspond to the patterns of metal, oxide, or semiconductor layers that make up the components of an integrated circuit. Accordingly, it becomes important to be able to accurately assess the difficulty of each layout so that use of resources and scheduling to manufacturing can be optimized.

For the above reasons, what is needed is an improved manner of assessing the amount of resources required to complete a VLSI design.

SUMMARY OF THE INVENTION

In a first exemplary embodiment, the invention relates to a method for assessing the amount of resources required to complete a VLSI design. At least one VLSI schematic is read from a library of schematics. The difficulty of generating a layout is determined based on predetermined statistics. Such statistics may include, but are not limited to at least the number of connections, pins, devices and instances included in a schematic. A report is generated indicating the amount of work required to generate the layout based on the statistics for the schematic.

In a more specific aspect, this is done for a plurality of schematics. For each type of statistic used, a predetermined weighted value is assigned to each statistic to assist in determining the difficulty. In a specific example a specific weighted formula is applied.

In an alternative aspect, embodiments of the invention relates to a system for assessing the amount of resources required to complete a VLSI design. The system includes a processor, a user interface, storage media and program code. The program code is configured to execute on the processor to provide the previously mentioned steps of the method.

In another aspect, embodiments of the invention include a program product with program code configured to perform the steps previously described with respect to the method. A computer readable medium bears the program code.

These and other advantages and features that characterize the invention are set forth in the claims annexed hereto and forming a further part hereof. However, for a better understanding of the invention, and of the advantages and objects attained through its use, reference should be made to the Drawings, and to the accompanying descriptive matter, in which there are described exemplary embodiments of the invention.

DETAILED DESCRIPTION

Figures 1, 3:
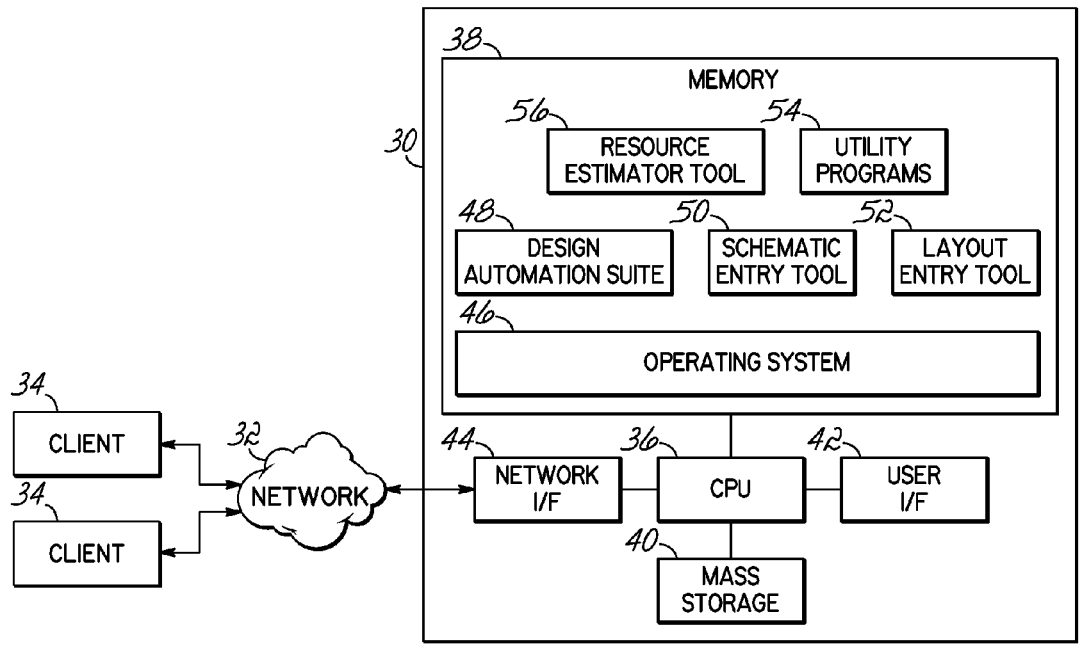
FIG. 1 is a block diagram of principal hardware components in a computer system suitable for implementing the method of the invention.
FIG. 3 is exemplary of the results of running the method of the invention, with the results placed in a separate file that can be imported into other tools and programs.

FIG. 1 illustrates an apparatus 30 that may be part of the system of the invention, including connections to a network 32 within which various steps in the process of the invention may be performed. Apparatus 30 in the illustrated embodiment is implemented as a server or multi-user computer that is coupled via a network 32 to one or more client computers 34. For the purposes of the invention, each computer 30, 34 may represent practically any type of computer, computer system or other programmable electronic device. Moreover, each computer 30, 34 may be implemented using one or more network computers, e.g., in a cluster or other distributed computing system. In the alternative, computer 30 may be implemented within a single computer or other programmable electronic device, e.g., a desktop computer, a laptop computer, a handheld computer, a cell phone, a set top box, etc.

Computer 30 typically includes a central processing unit (CPU) 36 including at least one microprocessor coupled to a memory 38. The memory 38 may represent random access memory (RAM) devices comprising the main storage of computer 30, as well as any supplemental levels of memory, e.g., cache memories, non-volatile or backup memories (e.g., programmable or flash memories), read-only memories, etc. In addition, memory 38 may be considered to include memory storage physically located elsewhere in the computer 30, e.g., any cache memory in a processor in CPU 36, as well as any storage capacity used as a virtual memory, e.g., as stored on a mass storage device 40 or on another computer coupled to computer 30. Computer 30 also typically receives a number of inputs and outputs for communicating information externally. For interfacing with a user or operator, computer 30 typically includes a user interface 42 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, computer 30 may also include one or more mass storage devices 40, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface 44 with one or more networks 32 (e.g., a LAN, a WAN, a wireless network, and/or the Internet, among others) to permit the communication or information with other computer and electronic devices. It should be appreciated that computer 30 typically includes suitable analog and/or digital interfaces between CPU 36 and each of components 38, 40, 42 and 44 as is well known in the art. Other hardware environments are contemplated within the context of the invention.

Computer 30 operates under the control of an operating system 46 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to computer 30 via network 32, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that when read and executed by one or more processors in a computer, cause that computer to perform the steps necessary to execute steps or elements embodying the various steps of the invention. Moreover, while the invention has and hereinafter will be described in the context of fully functioning computers and computer systems, those skilled in the art will appreciated that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as a volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocations of program functionality described herein.

Figure 2:
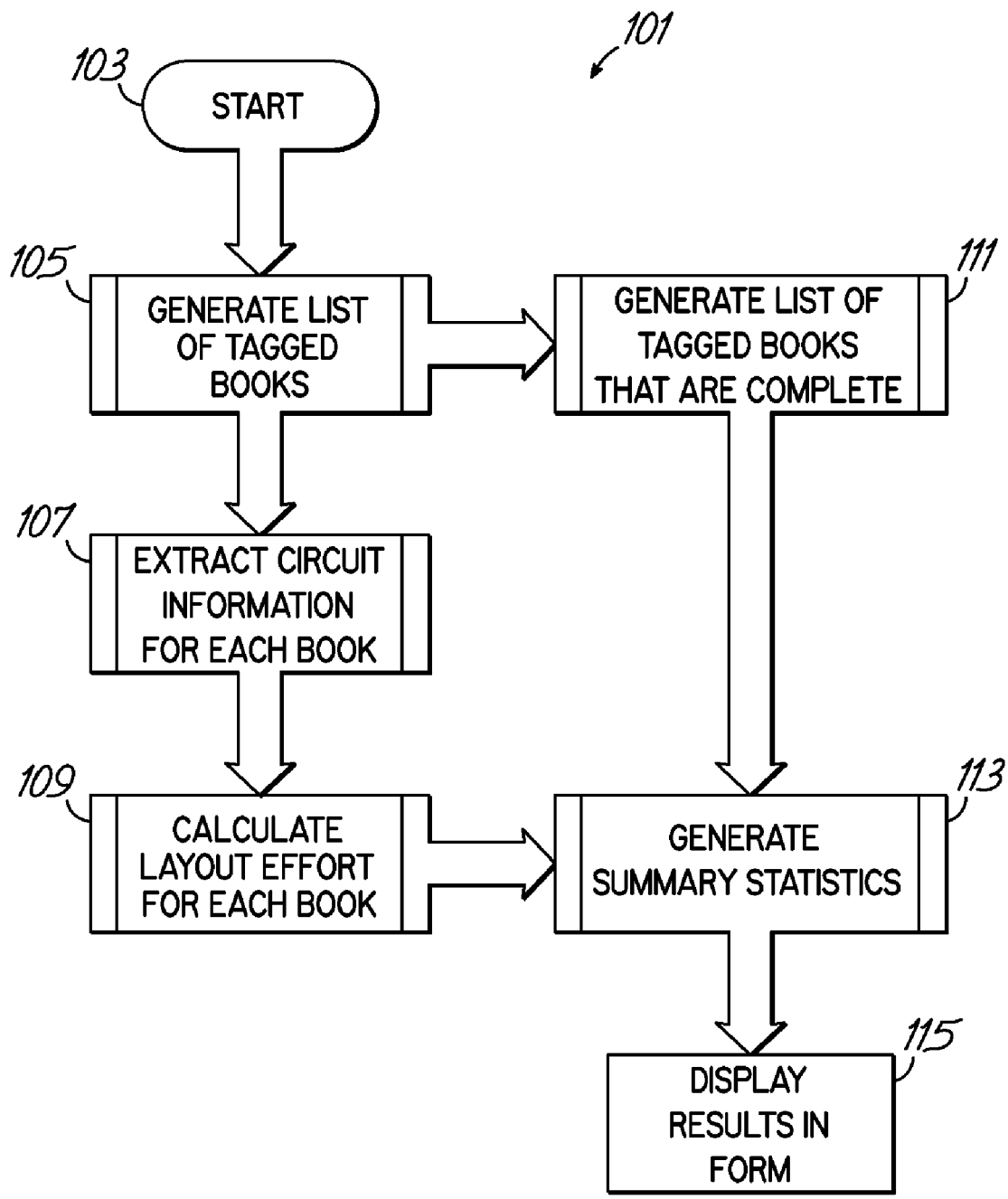
FIG. 2 is a flow chart depicting the overall process for generating a layout work estimate for schematics in a given library.

To implement the various activities in process 101 of FIG. 2, computer 30 includes a number of software tools, including, for example, a design automation suite 48, a schematic entry tool 50, layout entry tool 52, all generally containing what is generically referred to as "design code", utility programs 54, and a specific resource estimator tool 56 which is used in implementing the invention as described hereafter. Other tools utilized in connection with integrated circuit design, verification and/or testing may also be utilized in computer 30. Moreover, while tools 48, 50, 52, 54, and 56 are shown in a single computer 30, it will be appreciated by one of ordinary skill in the art having the benefit of the instant disclosure that typically these tools will be disposed in separate computers, particularly where multiple individuals participate in the design of a VLSI circuit. Such tools are generally commercially available from a number of vendors such as Cadence and Mentor Graphics, known to those of ordinary skill, and need not be discussed in greater detail herein. Therefore, the invention is not limited to the single computer implementation that is illustrated in FIG. 1.

Now turning to FIG. 2 and flow chart 101, the resource estimator tool 56 described hereinafter reads schematics in a library that the user has tagged as ready for layout. The tool 56 then serves to assess the difficulty of each layout based on specific statistics such as number of connections, pins and devices. Using the information, the tool 56 calculates the total amount of effort required to complete the design. By the term "effort" is the amount of design time expended by a layout designer to create the layout, which can be expressed in terms of man-hours. The tool 56 assesses progress made by reading layouts that are tagged complete and then generates a progress report. In accordance with embodiments of the invention, having a tool and integrated method to check progress and assess remaining layout work at any given time saves time and is more accurate as compared to current methods. The invention provides a common metric that can be used to compare past layout work take-downs to what can be expected on future work. By the term "take down" is meant the amount of time required to complete the layout once the schematic is complete.

As previously noted, flow chart 101 of FIG. 2 depicts the overall process implemented by the resource estimator tool 56 to generate a layout work estimate for a given library of schematics. In the method, before the resource estimator tool 56 is used, a designer creates schematics and tags ones that are ready for layout. The tagging allows the designer to have both schematics that are in flux and layout-ready ones in the same library. Each step is explained in further detail hereinafter.

When the tool 56 is started at step 103, it proceeds to generate a list of tagged books 105. In this step the tool 56 simply checks all the books in the library for the "schematic is ready for layout" property and generates a list of schematics. A list of tagged books that are complete is generated 111. More particularly, all the books in the list generated in step 105 are checked for the "layout is complete" property. This property can either be added by the layout designer tagging the book, or can be made a function of the result of checking tools, such as LVS and DRC. By the term DRC it is meant a Design Rule Check tool. By the term LVS it is meant a Layout Versus Schematic comparison tool which determines one to one equivalency between an intergrated circuit schematic and integrated circuit layout.

Thereafter, circuit information for each book is extracted 107. More particularly, for each book in the main list, the statistics are compiled that describe or are indicative of its complexity. This is done, in one exemplary embodiment, by recording the number of devices, pins, instances and connections. Thereafter, the layout effort is calculated for each book 109. In this step 109 the tool calculates the difficulty based on the information gathered in the preceding step. Weights are given for each statistic, e.g., devices, pins, instances, connections, etc.

Thus, in an exemplary embodiment, the difficulty of a given book may be increased by 0.15 for each additional device and increased by 0.05 for each additional pin, and so on as will be readily apparent to those of ordinary skill in the art. The actual weights can be changed by a user and are based on empirical results. This allows the accuracy of the assessment to be improved with each use of the tool. In an exemplary form, embodiments of the invention target a common book such as a 2 input NAND to have a difficulty rating of approximately 1.0, and the rest scales from that value.

One exemplary equation to assess difficulty may be as follows:

difficulty=((device count)*(device weight))+((pin count)*(pin weight))+((instance count)*(instance weight))+((connection count)*(connection weight))+...

Thereafter, summary statistics are generated 113. More particularly, from the previous steps, statistics are generated for a report. These statistics include, but are not limited to estimated layout effort for a total list, estimated layout effort for remaining books, and a completion represented as a percentage. The results may then be displayed 115 in a form such as the exemplary form 201 shown in FIG. 3. It is important to appreciate that the results may also be put into a file that may be imported into other tools resident on computer 30 such as a spreadsheet tool represented by the utility program 54 of FIG. 1.

As already noted, it will be appreciated that with respect to the design automation suite 48, and corresponding schematic entry tool 50 and layout entry tool 52, such tools are readily commercially available from numbers of vendors such as Cadance and Mentor Graphics. Thus, while tools available from these vendors are specifically referenced herein, it will be readily apparent to those of ordinary skill in the art that the invention is not limited to the tools available only from those companies, and can be implemented with a number of commercially available design automation suite tools currently in use in the design of VLSI circuits.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus and methods, and illustrative examples shown and described. Accordingly, departures may be made from such details without departing from the spirit or scope of Applicants' general inventive concept.

What is claimed is:

1. A method of assessing an amount of resources required to complete a very-large-scale integration (VLSI) design, comprising:
    reading a VLSI schematic from a library of schematics;
    automatically determining a difficulty rating book of generating a layout using an equation having inputs based on a plurality of components of the VLSI schematic;
    estimating an amount of time to generate the layout based on the difficulty rating; and
    generating a report indicating the estimated amount of time.

2. The method of assessing according to claim 1, further comprising reading a second schematic from said library, determining a second difficulty rating associated with generating a layout for the second schematic.

3. The method of assessing according to claim 1, further comprising assigning a predetermined weighted value to each of the plurality of components.

4. The method of assessing according to claim 1, wherein said plurality of components comprises a number of connections, pins and devices included for the schematic.

5. The method of assessing according to claim 1, wherein the equation includes: ((device count)*(device weight))+((pin count)*(pin weight))+((instance count)*(instance weight))+((connection count)*(connection weight)).

6. The method of assessing according to claim 1, wherein the layout is generated as a book, further comprising checking the book to determine that the layout is complete, and tagging the book to indicate the layout is complete.

7. The method of assessing according to claim 1, further comprising conducting said method when the layout is partially complete.

8. The method according to claim 1, further comprising assigning a weight to a device of the schematic that is greater than another weight assigned to a pin of the schematic.

9. The method according to claim 1, further comprising importing said report into another program.

10. A system for assessing an amount of resources required to complete a very-large-scale integration (VLSI) design, comprising;
    a processor;
    a user interface;
    storage media; and
    program code configured to execute on the processor, to read a VLSI schematic from a library including a plurality of VLSI schematics, to determine a difficulty rating book of generating a layout using an equation having inputs based on a plurality of components of the VLSI schematic, to estimate an amount of time to generate the layout based on the difficulty rating, and to generate a report indicative of the estimated amount of time.

11. The system according to claim 10, wherein said program code is further configured to read a second schematic from said library, to determine a second difficulty rating associated with generating a layout for the second schematic.

12. The system according to claim 10, wherein said program code is further configured to assign a predetermined weighted value for each of the plurality of components.

13. The system according to claim 10, wherein said plurality of components comprises a number of connections, pins and devices.

14. The system according to claim 13, wherein said program code is further configured to assign a weight to a device of the schematic that is greater than another weight assigned for a pin of the schematic.

15. The system according to claim 10, wherein said equation includes: ((device count)*(device weight))+((pin count)*(pin weight))+((connection count)*(connection weight)).

16. The system according to claim 10, further comprising design code for generating the layout as a book, wherein said program code is further configured to check the book to determine if the layout is complete, and to tag the book to indicate the layout is complete.

17. The system according to claim 10, wherein the layout is partially completed.

18. The system according to claim 10, wherein said program code is further configured to import the generated report into another program.

19. A program product, comprising:
program code configured to read a very-large-scale integration (VLSI) schematic from a library of VLSI schematics, to determine a difficulty rating book of generating a layout using an equation having inputs based on components of the VLSI schematic, to estimate an amount of time to generate the layout based on the difficulty rating, and to generate a report indicating the estimated amount of time work; and
a non-transitory computer readable medium bearing the program code.

20. The program product according to claim 19, wherein said program code is further configured to read a second schematic from said library, to determine a second difficulty rating associated with generating a layout for the second schematic.

* * * * *